US012566867B1

(12) United States Patent
Segu et al.

(10) Patent No.: US 12,566,867 B1
(45) Date of Patent: Mar. 3, 2026

(54) ADAPTIVE SELECTION OF SECURITY SCANNING IN SOFTWARE DEPLOYMENTS

(71) Applicant: Morgan Stanley Services Group Inc., New York, NY (US)

(72) Inventors: Murali Krishna Segu, Yamare (IN); Shobha Rani Jagathpal, Bengaluru (IN); Sachin Sundar, Bengaluru (IN); Vinay Prakash, Bengaluru (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/259,636

(22) Filed: Jul. 3, 2025

(51) Int. Cl.
*G06F 21/57* (2013.01)
*G06F 21/54* (2013.01)

(52) U.S. Cl.
CPC ............ *G06F 21/577* (2013.01); *G06F 21/54* (2013.01)

(58) Field of Classification Search
CPC ................................ G06F 21/577; G06F 21/54
USPC .......................................................... 726/25
See application file for complete search history.

(56) References Cited

U.S. PATENT DOCUMENTS

| | | | |
|---|---|---|---|
| 8,001,603 B1 | | 8/2011 | Kennedy |
| 8,555,391 B1 | * | 10/2013 | Demir ..................... G06F 21/56 |
| | | | 713/188 |
| 10,110,622 B2 | | 10/2018 | Boia et al. |
| 2011/0209215 A1 | | 8/2011 | Kabbara |
| 2013/0246135 A1 | * | 9/2013 | Wang ..................... G06F 17/00 |
| | | | 701/2 |

| | | | |
|---|---|---|---|
| 2016/0134650 A1 | | 5/2016 | Farmer et al. |
| 2016/0330219 A1 | * | 11/2016 | Hasan ..................... H04L 63/20 |
| 2018/0137279 A1 | | 5/2018 | Peyton, Jr. et al. |
| 2018/0293386 A1 | | 10/2018 | Barouni Ebrahimi et al. |
| 2018/0351989 A1 | | 12/2018 | Nazir |
| 2019/0109833 A1 | | 4/2019 | Segu et al. |
| 2020/0242859 A1 | * | 7/2020 | Merg ................... G07C 5/0808 |
| 2020/0404502 A1 | * | 12/2020 | Trivellato ........... H04L 63/1458 |

(Continued)

FOREIGN PATENT DOCUMENTS

| | | | | |
|---|---|---|---|---|
| CN | 106130980 A | * | 11/2016 | ......... H04L 63/1433 |
| CN | 116881923 A | * | 10/2023 | ........... G06F 21/577 |

(Continued)

OTHER PUBLICATIONS

Malzahn, Drew, Zachary Birnbaum, and Cimone Wright-Hamor. "Automated vulnerability testing via executable attack graphs." In 2020 International Conference on Cyber Security and Protection of Digital Services (Cyber Security), pp. 1-10. IEEE, 2020. (Year: 2020).*

(Continued)

*Primary Examiner* — Luu T Pham
*Assistant Examiner* — Walter J Malinowski
(74) *Attorney, Agent, or Firm* — HUNTON ANDREWS KURTH LLP

(57) ABSTRACT

Systems and methods for adaptive selection of security scanning in software deployments are disclosed. An embodiment of the present invention is directed to dynamically modifying scope based on specific code changes, third party risks and/or architectural changes. By selectively prioritizing and sequencing the scans, an embodiment of the present invention integrates language framework, third-party risks and design changes into a unified security scan workflow that optimizes efficiency while maintaining strong robust coverage.

16 Claims, 8 Drawing Sheets

(56) References Cited

U.S. PATENT DOCUMENTS

| | | | |
|---|---|---|---|
| 2021/0029154 A1* | 1/2021 | Picard | H04L 63/1408 |
| 2022/0353287 A1 | 11/2022 | Lekies et al. | |
| 2023/0015603 A1 | 1/2023 | Smith | |
| 2023/0205891 A1* | 6/2023 | Yellapragada | H04L 63/1416 |
| | | | 726/25 |
| 2023/0222051 A1* | 7/2023 | Priyanka | G06F 11/3608 |
| | | | 717/126 |
| 2023/0267918 A1* | 8/2023 | Abid | G10L 15/26 |
| | | | 704/235 |
| 2023/0334145 A1 | 10/2023 | Venkataraman et al. | |
| 2024/0119159 A1 | 4/2024 | Navarro-Dimm et al. | |
| 2024/0193276 A1* | 6/2024 | Grover | G06F 8/77 |
| 2024/0241962 A1 | 7/2024 | Rowell et al. | |
| 2025/0028840 A1 | 1/2025 | Zhang et al. | |
| 2025/0055869 A1 | 2/2025 | Barel et al. | |

FOREIGN PATENT DOCUMENTS

| | | | | |
|---|---|---|---|---|
| JP | 2022141966 A | 9/2022 | | |
| WO | WO-0193031 A1* | 12/2001 | | G06F 8/71 |

OTHER PUBLICATIONS

Polónio, João, José Moura, and Rui Neto Marinheiro. "On the road to proactive vulnerability analysis and mitigation leveraged by software defined networks: a systematic review." IEEE Access (2024). (Year: 2024).*

\* cited by examiner

ADAPTIVE SELECTION OF SECURITY SCANNING IN SOFTWARE DEPLOYMENTS

FIELD OF THE INVENTION

The present invention relates generally to software deployment and more specifically to an adaptive method and system for selecting appropriate security scanning techniques during various stages of a software deployment lifecycle.

BACKGROUND

In software development, security scanning generally refers to a process to identify vulnerabilities, weaknesses and security risks within a software application. Security scanning is an essential part of software development to ensure that the software application is secure and protected against potential threats including unauthorized access, data breaches and other malicious activities.

Currently, security scanning in software deployments suffers from inefficiencies, such as indiscriminate scanning that triggers numerous false positives and consumes excessive computational resources. Further compounding the problem, the same vulnerabilities are frequently identified by multiple scanning engines, leading to an inefficient, time-consuming and overwhelming security assessment process.

In the realm of software deployments, significant issues arise wherein security scanning services are initiated without an understanding of alterations made to the software. This lack of contextual awareness leads to an excessive volume of alerts for developers, stemming from various scanning tools and resulting false positives.

Accordingly, there is a need for an improved system and method for adaptive selection of security scanning techniques during various stages of a software deployment lifecycle.

SUMMARY

Systems and methods for implementing a systematic design to intelligently select security scanning procedures based on a comprehensive evaluation of code-level changes, deviations in design, alterations in configurations, shifts in deployment configurations and/or other changes are provided. An embodiment of the present invention is directed to an intelligent system and method for adaptive selection of security scanning chain in software deployments. The innovative system and method introduces context and intelligence into the scanning process, which optimizes resource utilization, reduces noise, and enhances the precision of security risk assessments.

According to an embodiment, a computer-implemented system comprises: a computer server comprising one or more processors; a memory component that stores and manages software development data; and non-transitory memory comprising instructions that, when executed by the one or more processors, cause the one or more processors to: initiate, via a software development pipeline, an update in a software application during a software development cycle; detect, via a change evaluation processor, a change in the software application between the update and a prior version wherein the change is assigned a corresponding change type; perform, via a contextual awareness processor, a contextual analysis for the detected change based on a potential impact of the change on the software application; determine, via a risk assessment processor, a risk assessment based on the contextual analysis for the detected change; generate, via a demand generator, a scan demand plan that comprises a set of scan tools from a pool of scan tools in a predetermined order to adaptively address the risk assessment; apply, via an integration interface, the set of scan tools according to the predetermined order; receive, via a communication network, a set of results from each of the set of scan tools; correlate the set of results in a manner that generates a composite result of vulnerabilities; and provide, via a communication network, the composite result of vulnerabilities.

According to another embodiment, a computer-implemented method comprises the steps of: initiating, via a software development pipeline, an update in a software application during a software development cycle; detecting, via a change evaluation processor, a change in the software application between the update and a prior version wherein the change is assigned a corresponding change type; performing, via a contextual awareness processor, a contextual analysis for the detected change based on a potential impact of the change on the software application; determining, via a risk assessment processor, a risk assessment based on the contextual analysis for the detected change; generating, via a demand generator, a scan demand plan that comprises a set of scan tools from a pool of scan tools in a predetermined order to adaptively address the risk assessment; applying, via an integration interface, the set of scan tools according to the predetermined order; receiving, via a communication network, a set of results from each of the set of scan tools; correlating the set of results in a manner that generates a composite result of vulnerabilities; and providing, via a communication network, the composite result of vulnerabilities.

BRIEF DESCRIPTION OF THE DRAWINGS

In order to facilitate a fuller understanding of the invention, reference is made to the attached drawings. The drawings should not be construed as limiting the invention, but are intended only to illustrate different aspects and embodiments of the invention.

DETAILED DESCRIPTION

Figure 1:
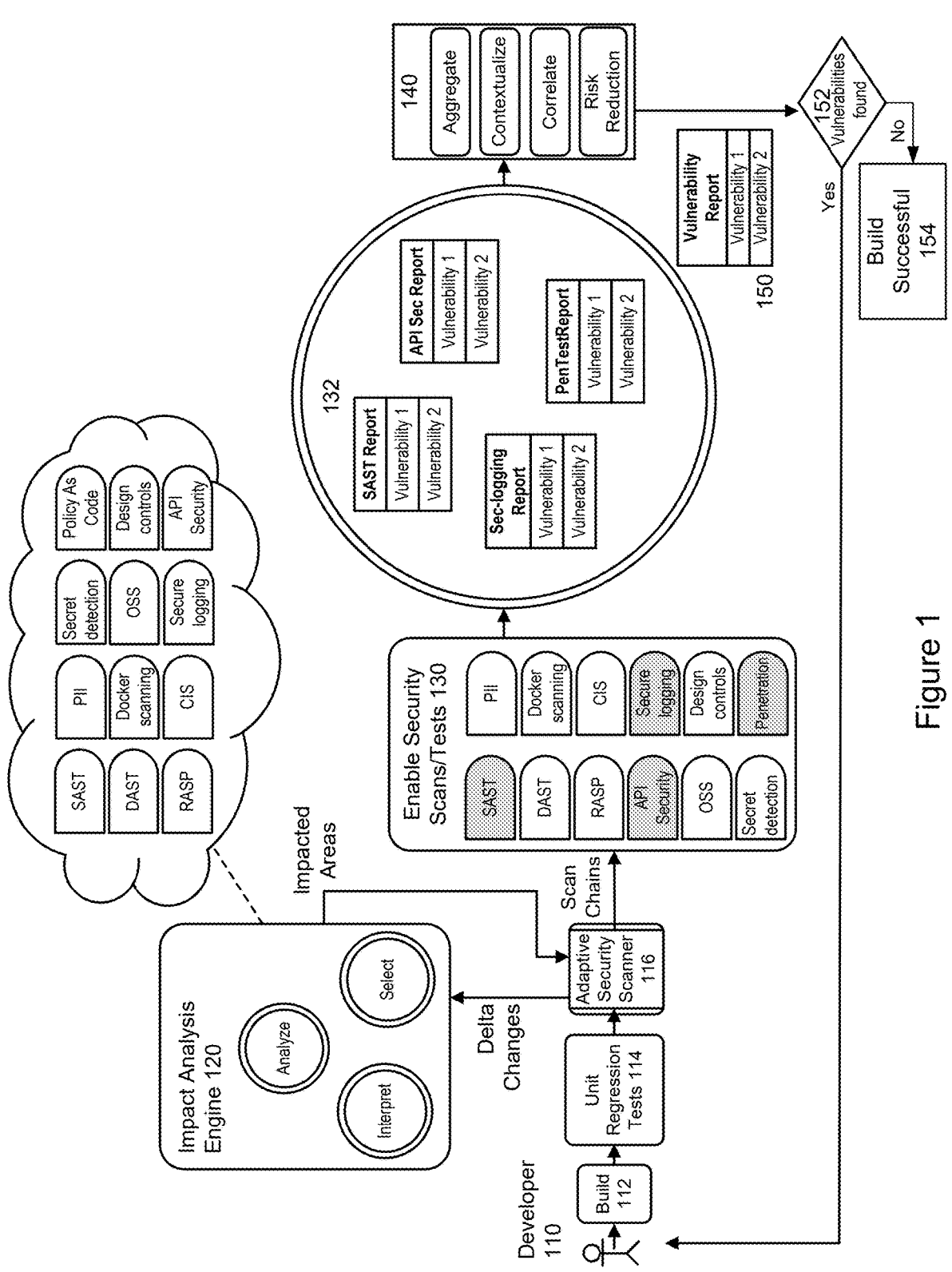
FIG. 1 is an exemplary system diagram, according to an embodiment of the present invention.

Exemplary embodiments of the invention will be described in order to illustrate various features of the invention. The embodiments described herein are not intended to be limiting as to the scope of the invention, but rather are intended to provide examples of the components, use, and operation of the invention.

Security scanning in software development identifies vulnerabilities, weaknesses and security risks within a software application. Security scanning may also ensure compliance by verifying that the software aligns with various standards and regulations (e.g., HIPAA, privacy, etc.). In addition, risks may be mitigated by identifying and addressing security issues prior to software deployment.

Current security assessments are static in nature and applied uniformly across projects. For any software change, a build process would trigger a host of standard security scans. There is currently no existing mechanism that dynamically determines security assessments based on a multi-dimensional security analysis.

An embodiment of the present invention is directed to an adaptive scan chain that introduces a dynamic and intelligent workflow that evolves based on real-time scan results. This ensures a more efficient, precise, and resource-conscious security scanning process, addressing the inefficiencies of conventional systems and methods.

For example, adaptive scan chain provides adaptive chaining, context-aware scanning, optimized resource utilization, enhanced precision and integration with various tools.

With Adaptive Chaining, the scanning process is adaptive in nature, forming a dynamic chain of security scans based on the outcomes of preceding scans. Each scan in the chain may be triggered conditionally, depending on the results of the previous scan, ensuring targeted and efficient scanning.

With Context-Aware Scanning, an embodiment of the present invention evaluates code changes, design deviations, and configuration shifts to determine an optimal and relevant scanning procedures. This reduces unnecessary scans and minimizes false positives.

By intelligently selecting scans, an embodiment of the present invention may reduce computational overhead and optimizes resource consumption.

An embodiment of the present invention provides enhanced precision through an adaptive nature of the scan chain that ensures that vulnerabilities are identified with higher accuracy, reducing redundancy and improving risk assessment.

An embodiment of the present invention may integrate seamlessly with existing scanning engines, leveraging their capabilities while orchestrating them intelligently. Accordingly, an embodiment of the present invention seeks to refine and optimize the security scanning process in software deployments, reducing noise, improving accuracy, and ensuring efficient utilization of resources.

An embodiment of the present invention is directed to dynamically modifying scope based on specific code changes, third party risks and/or architectural changes. By selectively prioritizing and sequencing the scans, an embodiment of the present invention integrates language framework, third-party risks and design changes into a unified security scan workflow that optimizes efficiency while maintaining strong robust coverage.

For example, an embodiment of the present invention is directed to evaluating change during software development. This may occur by consuming commit diffs, dependency graphs and security intelligence. Based on the evaluated change, an embodiment of the present invention may automatically identify and select a set of scans to perform and apply a rule-based context analyzer to determine an optimal scan sequence. Commit diffs represent changes made to a codebase between two points in time, e.g., two commits in a version control system. In addition, commit diffs may identify or highlight changes in code, showing lines of code that have been added and lines that have been removed. Dependency graphs provide a visual representation of dependencies between different components or modules within a software project. For example, dependency graphs may illustrate components as nodes and dependencies as edges connecting the nodes, thereby illustrating the relationships and connections. An embodiment of the present invention may support other tools that identify and manage various changes in software applications.

For example, if a developer makes limited code changes, an embodiment of the present invention may identify the scope of changes (which in this case may amount to a few lines of code changes) and trigger a smaller subset of tools relevant to the changes and appropriate for the context instead of an entire pool of security scans and checks.

FIG. 1 is an exemplary system diagram, according to an embodiment of the present invention. As shown in FIG. 1, Developer 110 may engage in a software build process, shown by Build 112, and initiate testing through Unit Regression Tests 114. Unit Regression Tests 114 may represent testing focused on verifying that individual units or components of software continue to function correctly after modifications, such as code changes, bug fixes, etc. Unit Regression Tests 114 may focus on small testable parts of an application, such as functions or methods, rather than an entire system.

Adaptive Security Scanner 116 may identify delta changes that may be provided to an Impact Analysis Engine 120. Impact Analysis Engine 120 may perform various functions including Analyze, Interpret and Select. Impact Analysis Engine 120 may interpret and analyze the delta changes to impacted areas to be scanned, such as API controllers, business logic, cipher changes, persistence changes, etc.

An embodiment of the present invention may apply an artificial intelligence (AI)/machine learning (ML) component/feature to continuously improve and refine optimization of identifying and applying scanning tools. For example, an embodiment of the present invention may apply AI/ML to improve and iterate on the logic of mapping the identified changes to an optimal set of scanning tools.

Delta changes may be identified by comparing a current version of the software to an earlier version. Other mechanisms for identifying changes may be applied.

Impacted areas may be identified and provided to Adaptive Security Scanner 116. In response, Adaptive Security Scanner 116 may identify a sequence of tools or a Scan Chain to address the identified delta changes and the impacted areas. Scan Chains may be communicated to enable security scans/tests at 130. In addition, the impacted areas may be prioritized and analyzed in accordance with various business and security objectives that may be configured for specific entities, businesses, industries, objectives, etc. Compliance to security standards and regulations as well as best practices may be considered.

As shown in FIG. 1, Scan Chain may include a set of tools to be applied in a specific order, e.g., SAST, API Security, Secure Logging and Penetration. Scan Chains may be simple (e.g., a sequence of two or more tests) or complex involving many tools where operation is based on predetermined conditions, thresholds, restrictions, sequences, etc.

For each tool, resulting reports may be generated, as shown by 132. Based on the reports, an embodiment of the present invention may aggregate, contextualize, correlate and determine risk reductions at 140. For example, common vulnerabilities may be identified and correlated. In addition, business and security considerations may be analyzed to determine risk assessments. For example, a client facing application may be concerned with security threats or breaches and not as concerned with other findings.

A composite vulnerability report may be generated at 150. Instead of separate reports for each security tool with redundant, duplicate, isolated and/or incomplete responses, an embodiment of the present invention may aggregate, contextualize and correlate the responses in a composite report, as shown by 150. An embodiment of the present invention may apply AI/ML to improve and iterate on the logic of aggregating, contextualizing and correlating report outputs to a comprehensive composite report or other output.

If vulnerabilities are identified at 152, the risks may be provided to Developer 110. In addition, the risks may be communicated to a receiving system that may then automate an appropriate response and/or implement set of actions to address the identified risks. If no vulnerabilities are found, the build may be deemed successful at 154.

An embodiment of the present invention is directed to impacted code analysis based on contextual awareness. According to an embodiment of the present invention, a security assessment may be determined via abstract syntax tree analysis to identify class and/or function modifications and graph-based code impact analysis. Abstract syntax tree may represent a technique to understand and manipulate the structure of source code. More specifically, abstract syntax tree may include a tree representation of the syntactic structure of code generated by parsing source code according to rules of a programming language. Abstract syntax tree analysis may be applied to identify structural issues in code (e.g., redundant or inefficient constructs) and potential security vulnerabilities. In addition, an embodiment of the present invention may leverage a dependency graph to trace affected downstream components. Other analysis tools may be applied in accordance with the various embodiments of the present invention.

An embodiment of the present invention is directed to third party dependencies and software composition analysis. An embodiment of the present invention may dynamically adjust based on newly introduced dependencies, changes in interconnected dependencies and software bill of materials.

An embodiment of the present invention may adapt to various changes including design level changes. An embodiment of the present invention may dynamically detect design level changes such as refactoring the core business logic which necessitates revalidation of existing security controls, migrating to different cloud provider triggering cloud specific security scans, and transitioning from monolithic to micro services incorporate additional security scans related to API security checks.

Figure 2:
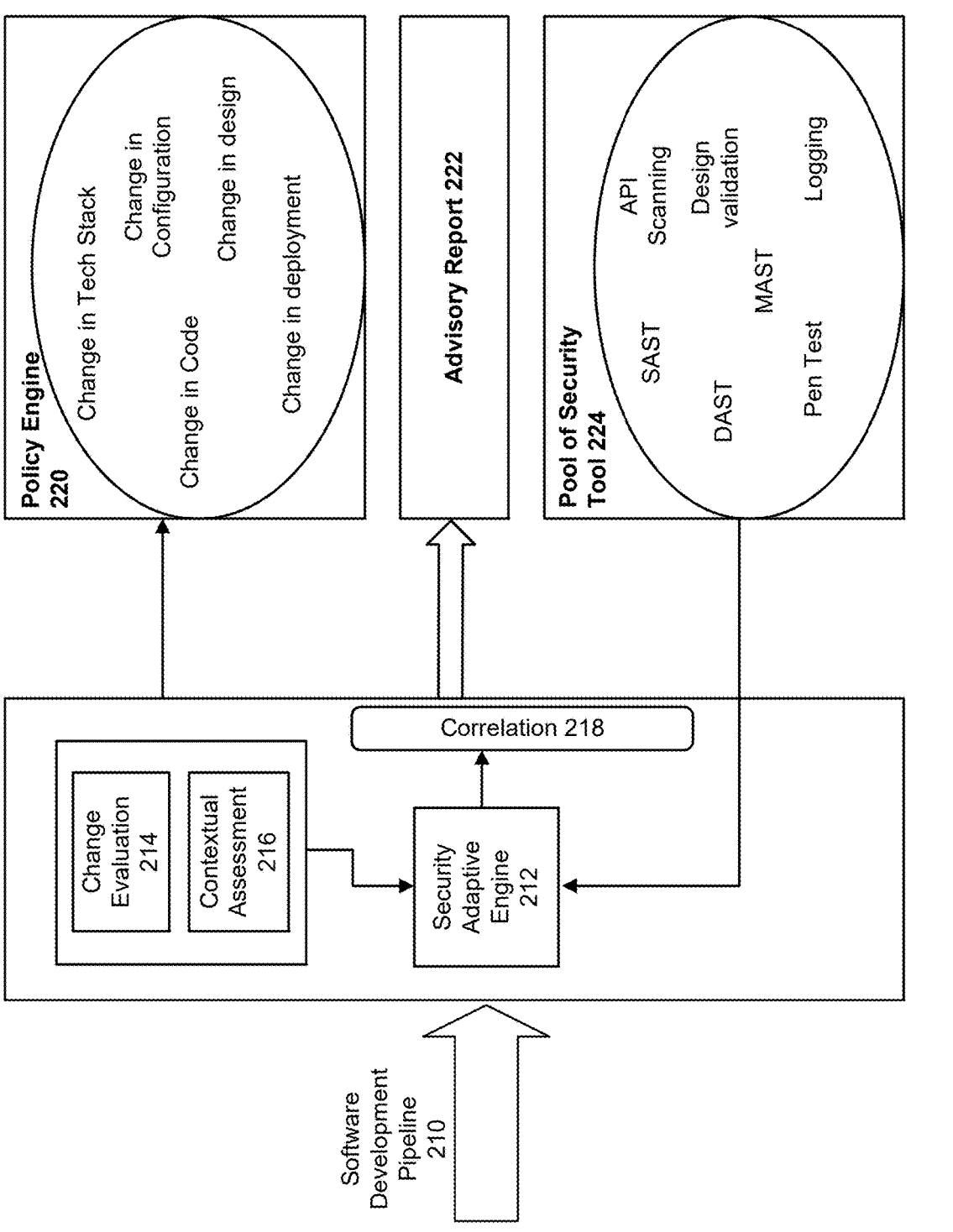
FIG. 2 is an exemplary system diagram, according to an embodiment of the present invention.

FIG. 2 is an exemplary system diagram, according to an embodiment of the present invention. As shown in FIG. 2, Software Development Pipeline 210 may feed into Security Adaptive Engine 212. Change Evaluation 214 and Contextual Assessment 216 may communicate with Security Adaptive Engine 212. The results may be aggregated, contextualized and correlated through Correlation 218.

Policy Engine 220 may identify various changes including change in technology stack, change in configuration, change in code, change in design, change in deployment, etc. Policy Engine 220 may be configurable and customized for a particular entity, business, industry, objective, etc. For example, an entity with an e-commerce business may be more focused on API securities of external facing applications. Other business objectives may be configured.

Pool of Security Tools 224 may include a set of security tools including SAST, API Scanning, DAST, MAST, design validation, penetration test, logging, etc. The Pool of Security Tools 224 may be customized for a particular entity, business, industry, objective, etc.

SAST (Static Application Security Testing) may analyze source code or compiled versions of code to identify vulnerabilities without executing the program. SAST may identify issues such as SQL injection, cross-site scripting, buffer overflows, etc.

DAST (Dynamic Application Security Testing) may test a running application to identify vulnerabilities that occur during execution. DAST may simulate attacks to identify issues such as authentication vulnerabilities, session management problems, etc.

MAST (Mobile Application Security Testing) may identify vulnerabilities in mobile applications, ensure compliance with security standards and protect against threats specific to mobile environments.

Advisory Report 222 may provide a security scan recommendation that details an array of security scan tools and/or services applicable for an identified change, such as an application drift.

Figure 3:
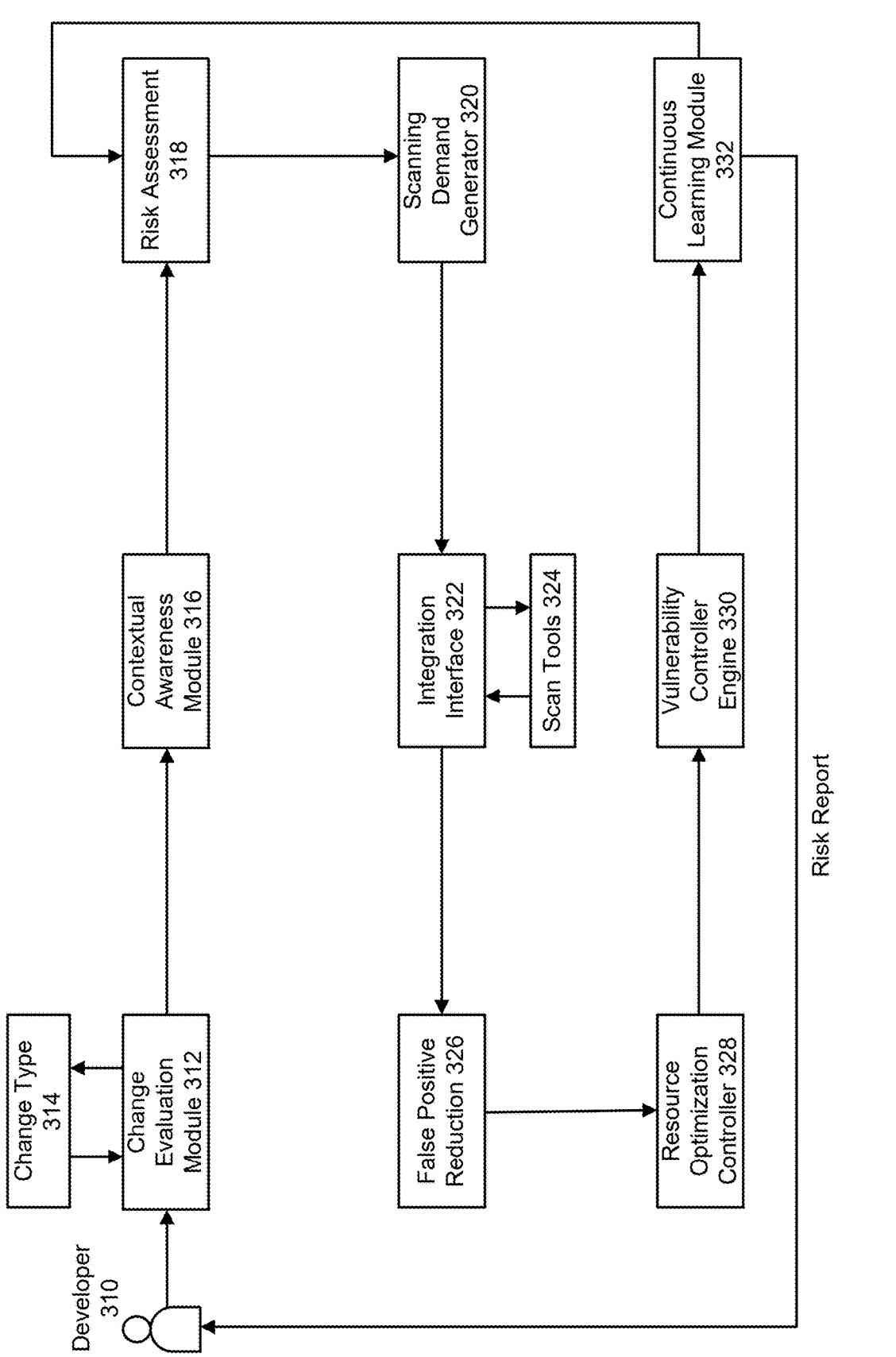
FIG. 3 is an exemplary flowchart, according to an embodiment of the present invention.

FIG. 3 is an exemplary flowchart, according to an embodiment of the present invention. An embodiment of the present invention is directed to building an intelligent system for adaptive selection of security scanning in software deployments. FIG. 3 illustrates components that operate together to create a robust and effective solution.

As shown in FIG. 3, Developer 310 may make changes in software. For example, a software development team may initiate a software update.

Changes regarding the software update may be evaluated. For example, a Change Evaluation Module 312 may monitor and evaluate changes during the update. This may involve comparing a current version with an earlier version. Change Evaluation Module 312 monitors and evaluates software changes, including code-level modifications, design drifts, configuration adjustments, and deployment configuration changes. Change Type 314 may identify the type of change detected. Change type may include code change, design change, technology stack change, deployment change, configuration change, etc. Other types of change may be considered. Change types may be specific to the type of software, line of business, industry, regulation, etc.

Contextual Awareness Module 316 assesses the significance of detected changes, distinguishing between minor adjustments and potential security relevant alterations. For example, a Contextual Awareness Module may make a contextual assessment that assesses the nature and significance of changes. This may involve determining whether the change is minimal or significant based on predetermined thresholds, etc. Other levels of granularity in assessing the change may be applied.

Contextual Awareness Module 316 may apply various rankings that may be deployed within a specific organization, entity, unit, etc. An organization may manage infrastructure in different ways based on the business, security and/or other considerations. Rankings may include application asset rankings, infrastructure rankings, business key services, etc. In addition, an organization may identify or assign categories, classes, hierarchies, taxonomies and/or other types of classification of various assets. Using an organization's rankings and/or other business considerations, Contextual Awareness Module 316 may assess significance of detected changes.

Other considerations may include the type of organization (e.g., e-commerce, healthcare, financial, etc.), use of personally identifiable information (PII), internal or external, etc. For an internal facing application, a detected change relating to a minor feature may be considered a low risk and therefore a smaller subset of scans may be identified. For an external facing application, a similar detected change may be assigned a higher risk given the interactions with client sensitive data. Accordingly, a more aggressive set of scans may be identified to minimize potential risk.

Risk Assessment 318 calculates the risk associated with changes, considering factors such as application sensitivity, predefined risk thresholds, etc. For example, a change in protocol (e.g., secure protocol to a non-secure protocol) may be considered a high impact and high risk change. According to another example, a few lines of code change for a non-core function may be considered a low impact and low risk change. In yet another example, infrastructure related change such as adding a server to a server pool may be considered a low impact and no risk change. Accordingly, Risk Assessment 318 may execute an algorithm to calculate the risk associated with detected changes and send the results to Scanning Demand Generator 320. Certain changes may be considered lower risk than others. For example, an infrastructure related change may be assessed as a lower risk while a security related risk may be deemed a higher risk. A few lines of code change for a non-core function may be considered a low impact and low risk change. According to another example, a change from a secure protocol to a non-secure protocol would increase risk and trigger additional scans.

Scanning Demand Generator 320 prioritizes scanning tasks based on risk assessment results by triggering a set of scans for relevant changes. For example, a code change may trigger SAST scanning to identify code vulnerabilities. An infrastructure change may require a different type of scan to determine vulnerabilities.

Depending on the risk assessment, Scanning Demand Generator 320 may generate a set of dynamic security scans for certain software updates/applications. For an external facing application, a set of scan tools may be identified in a specific sequence with the output of a tool may be used as an input for a subsequent tool. The set of scanning tools may be identified as Tool 1, Tool 2, . . . Tool N. In this example, the output of Tool 1 may be used as an input to Tool 2. In addition, the output of a tool may be used to narrow or focus the tasks for a subsequent tool. Tool 2 may identify an increased risk to a specific component which may then be used to narrow and focus the scope of a subsequent Tool 3 in response.

According to another example, Tool 1 may identify an API vulnerability. Because Tool 1 has detected and identified a specific API vulnerability, a subsequent Tool 2 may focus on a particular API testing instead of generalizing the testing of all APIs. The specific sequence may be performed in a particular order or manner. In addition, some of the scan tools may be performed in parallel. This may be relevant for scan tools that perform independently.

Integration Interface 322 communicates with security scanning tools and activates a set of scanning tools according to scanning demands. Scan Tools 324 may represent a pool of available scanning tools and mechanisms. The set of scanning tools may be initiated/activated. For example, Integration Interface 322 may activate a relevant set of scanning tools from the pool of available scanning tools and mechanisms.

Security scanning may be performed where the set of scanning tools conduct security scans on high-risk areas.

False Positive Reduction Mechanism 326 reduces false positives generated during security scans.

Resource Optimization Controller 328 manages computational resource allocation for efficient scanning. An embodiment of the present invention may enhance computational resource allocation by optimizing efficiency through various AI/ML techniques, including predictive modeling, dynamic resource allocation, load balancing, energy efficiency, anomaly detection, task scheduling, cost optimization, etc.

Vulnerability Consolidation Engine 330 consolidates and deduplicates vulnerabilities identified by multiple scanning engines.

Continuous Learning Module 332 refines risk assessment criteria based on previous assessments and outcomes. An embodiment of the present invention may apply AI/ML to continuous learning to enable the system to adapt and improve with ongoing data input. The system may adapt to new information, improve predictions and achieve optimization.

Results may be generated and remediation may be performed. For example, the system may generate reports and alerts for stakeholders and/or other recipients. In addition, security vulnerabilities may be addressed based on the report.

When the update is considered complete, software deployment may be initiated.

Figure 4:
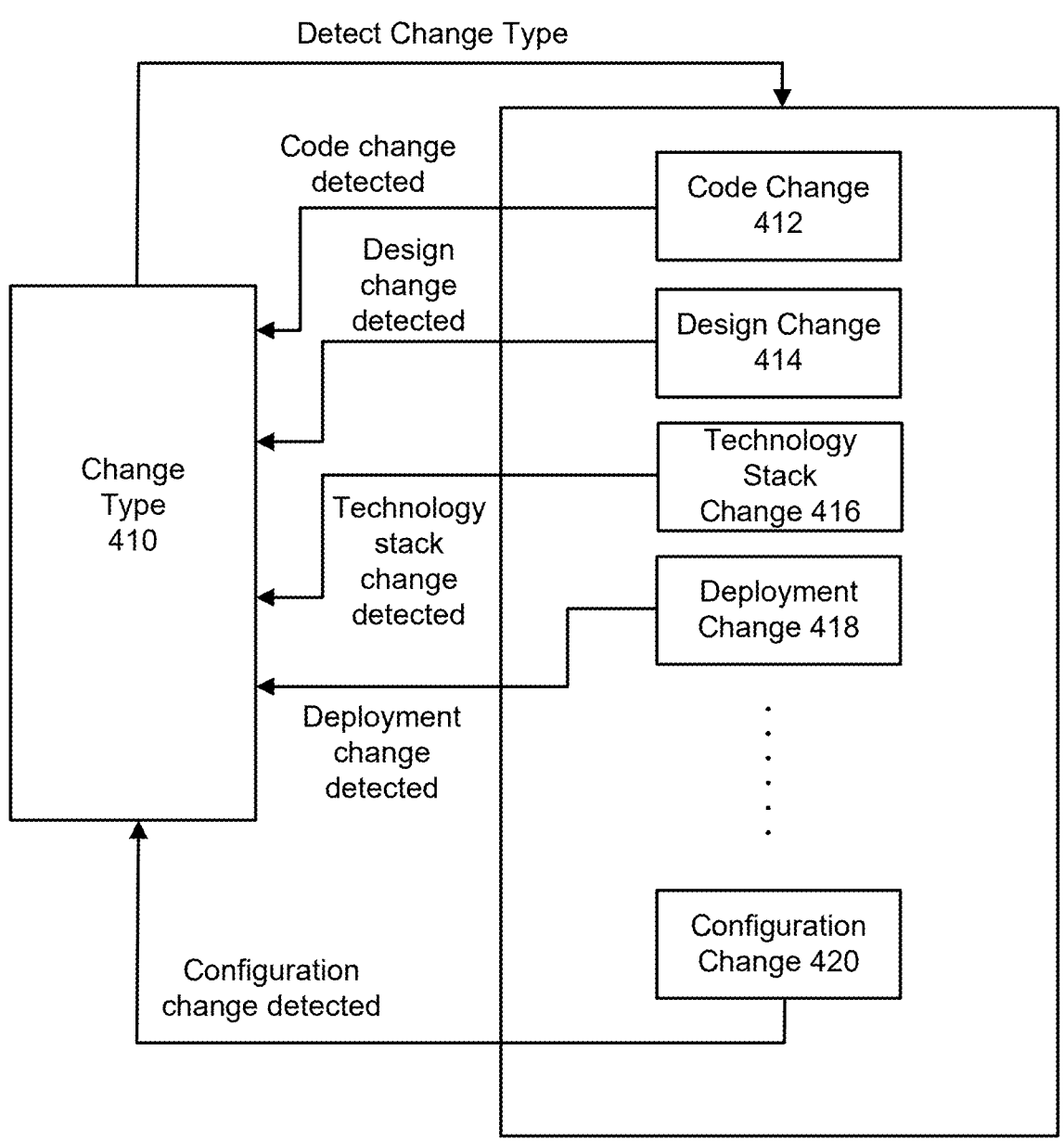
FIG. 4 is an illustration of change types, according to an embodiment of the present invention.

FIG. 4 is an illustration of change types, according to an embodiment of the present invention. As shown in FIG. 4, an embodiment of the present invention may assess and evaluate—the changes in software and respond back to the system.

An embodiment of the present invention may evaluate various scanning tools and services based on change type and/or other information. Change Type 410 may include: Code Changes 412; Design Changes 414; Technology Stack Changes 416, Deployment Changes 418, Configuration Changes 420 as well as other types of changes including API changes, etc . . . .

Code Changes 412 may involve: SAST (Static Application Security Testing), SCA (Software Composition Analysis), etc.

Design Changes 414 may involve: Threat Modeling, Risk-Based Assessment, etc.

Technology Stack Changes 416 such as API Changes may involve: DAST (Dynamic Application Security Testing), API Security Testing, etc.

Deployment Changes 418 may involve: DAST (Dynamic Application Security Testing), RASP (Runtime Application Self-Protection), Penetration Testing (pentest), etc.

Configuration Changes 420 may involve: IaC (Infrastructure as Code) scanning, Cloud Configuration Scanning, etc.

Figure 5:
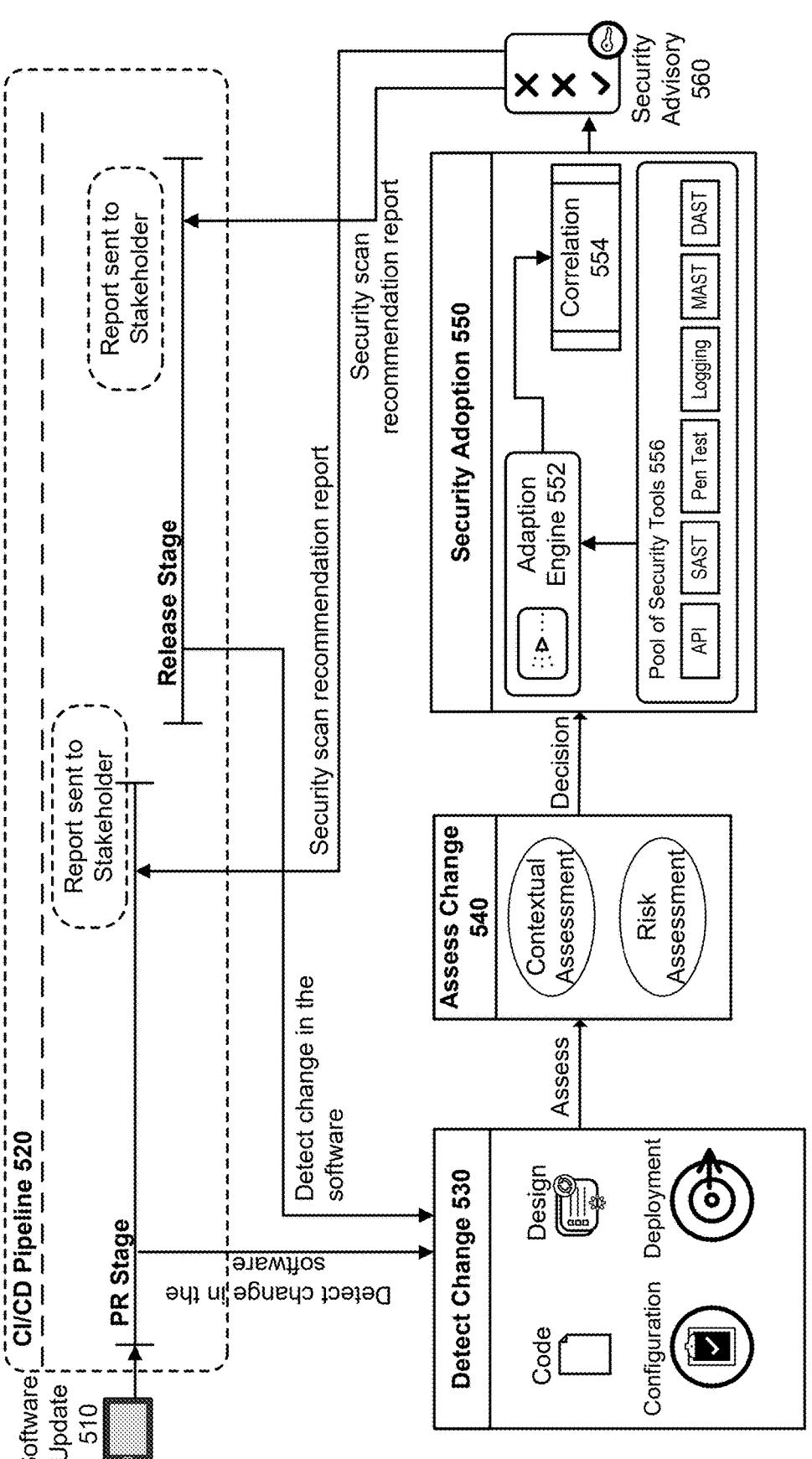
FIG. 5 is an illustration of a software update, according to an embodiment of the present invention.

FIG. 5 is an illustration of a software update, according to an embodiment of the present invention.

Software Update may be initiated at 510 through CI/CD Pipeline 520. CI/CD Pipeline 520 represents an automated sequence of processes in software development that facilitates continuation integration (CI) and continuous deployment (CD) by streamlining the development workflow and automating build, test and deployment phases enabling rapid and reliable software delivery.

During PR Stage, changes in the software may be detected and communicated to Detect Change 530. The PR Stage refers to processes associated with Pull Requests (PRs). A Pull Request is a method used in version control systems to propose changes to a codebase. The PR stage in a CI/CD pipeline ensures that the changes are reviewed, validated and ready for integration into the main codebase.

Detect Change 530 may identify various changes including changes in Code, Design, Configuration, Deployment, etc. An embodiment of the present invention may compare a current version with a prior version and determine whether the change is minimal or significant based on the comparison. The determination of change may be based on a threshold (e.g., low, medium, high), qualitative analysis (e.g., changes to important module/feature) and/or may provide detailed change information (e.g., type of change, quantity of change, etc.). As discussed above, FIG. 4 provides additional details relating to change type, according to an embodiment of the present invention.

The detected changes may be assessed at Assess Change 540 through Contextual Assessment and Risk Assessment. Decisions or other determinations may be communicated to Security Adoption 550.

Security Adoption 550 may include Adaption Engine 552 and Correlation Engine 554 that determines a set of security tools from a Pool 556.

Security Advisory may be generated at 560 which may then provide a security scan recommendation report to stakeholders and/or other recipients at a Release Stage. A security scan recommendation report may also be communicated to stakeholders at a PR Stage.

An embodiment of the present invention may provide various benefits and efficiencies. This may include: enhanced security with targeted scans; efficient resource allocation; improved developer productivity and cost reduction.

An embodiment of the present invention may be applied in various applications and support a wide range of implementations.

For example, applications may support: software development companies; cloud service providers; cybersecurity firms; enterprises and organizations; Managed Security Service Providers (MSSPs); government and defense agencies; healthcare and finance sectors; IoT and embedded systems manufacturers; educational institutions; consulting services, etc.

Accordingly, the various embodiments of the present invention provide a valuable solution for more efficient and precise security scanning in software deployments, with applications across diverse industries and sectors.

Figure 6:
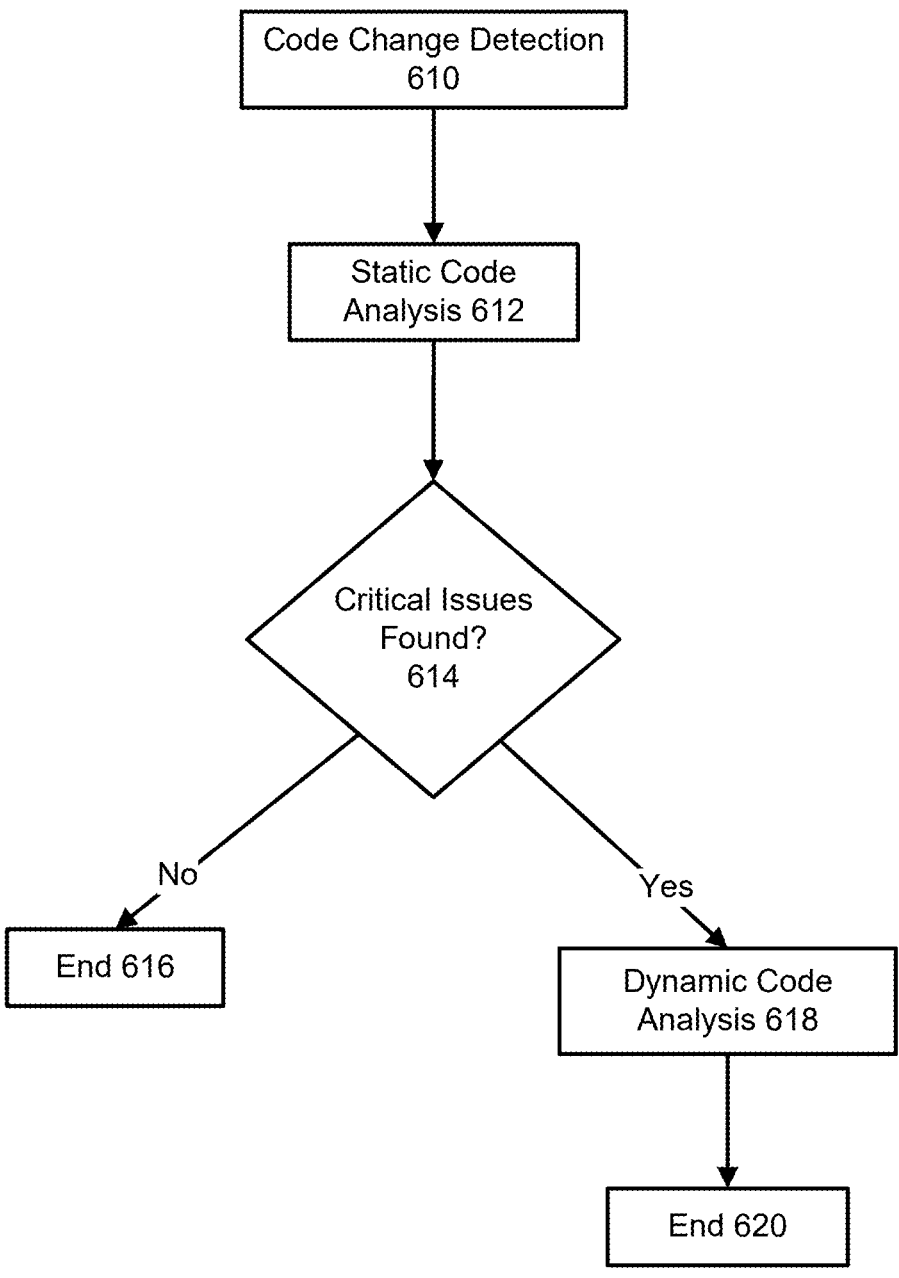
FIG. 6 is an exemplary flow diagram, according to an embodiment of the present invention.

FIG. 6 is an exemplary flow diagram, according to an embodiment of the present invention. FIG. 6 illustrates a flowchart that supports minor code changes. When minimal changes are made to the codebase (e.g., a small bug fix or a minor configuration update), the adaptive scan chain intelligently selects only lightweight scans that are relevant to the specific changes.

Step 610 represents a Code Change Detection. In this example, minimal changes in the codebase may be identified. At an initial scan, a lightweight static code analysis scan may be triggered at step 612 to check for vulnerabilities in the modified code.

According to a conditional scan, if no critical issues are found (at step 614), the process terminates at 616 thereby avoiding unnecessary scans. If issues are detected, a targeted dynamic scan is initiated to validate the vulnerabilities further at step 618. The process ends at 620.

Figure 7:
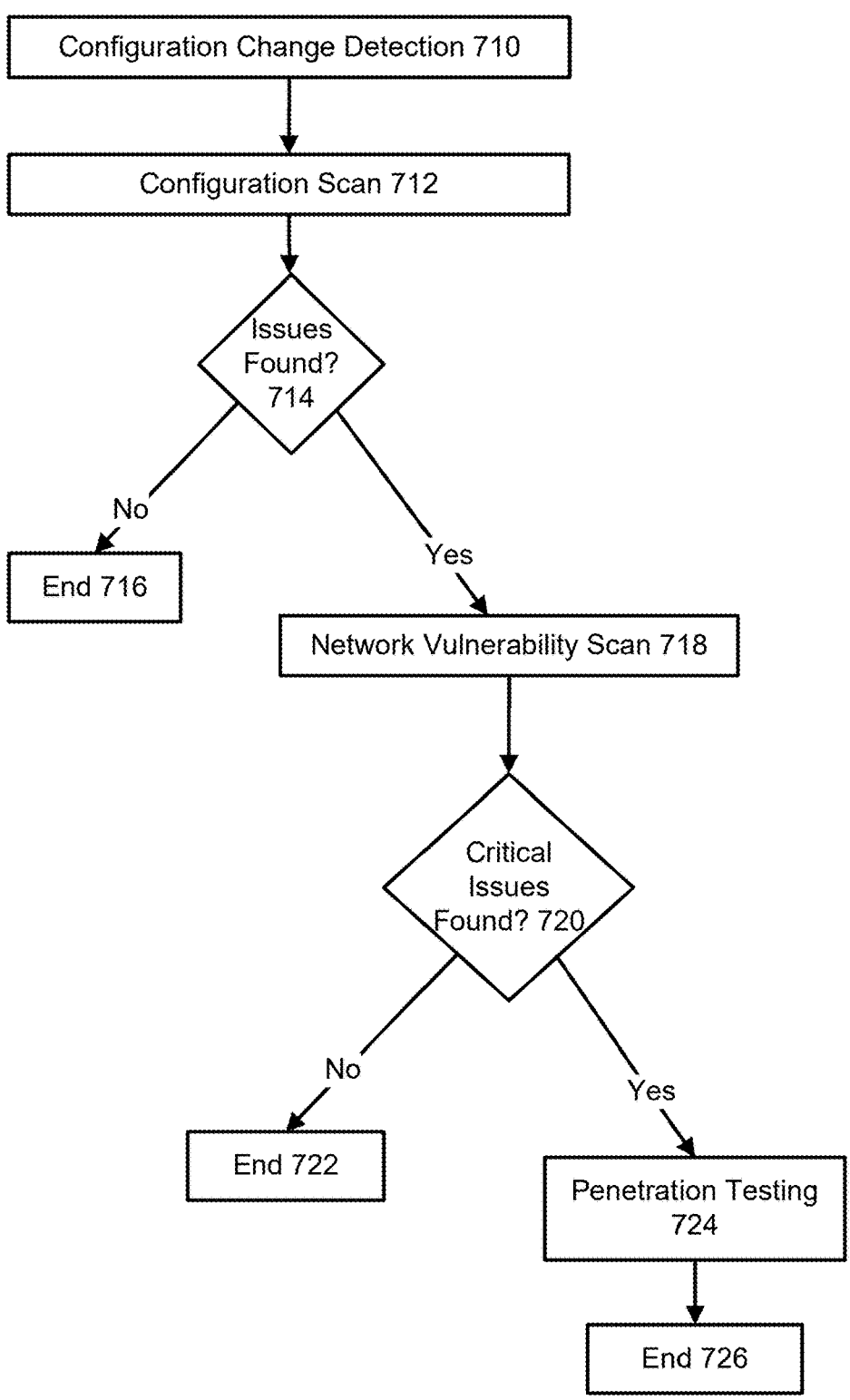
FIG. 7 is an exemplary flow diagram, according to an embodiment of the present invention.

FIG. 7 is an exemplary flow diagram, according to an embodiment of the present invention. FIG. 7 illustrates a flowchart that supports major deployment configuration changes.

When significant changes are made to deployment configurations (e.g., introducing new services or modifying network settings), the adaptive scan chain triggers a comprehensive set of scans to ensure the security of the new environment.

Step 710 represents a Configuration Change Detection. In this example, major changes in deployment configurations may be identified. At an initial scan, a configuration scan may be triggered at step 712 to validate the integrity of the new settings.

According to a conditional scan, if vulnerabilities are detected (at step 714), a network vulnerability scan may be initiated to assess the impact on the broader environment, at step 718. If none are found, the process ends at 716.

Based on the results of the network scan (at step 720), a penetration test may be performed to simulate real-world attack scenarios, at step 724. The process ends at 726. If no critical issues are found at 720, the process ends at 722.

Figure 8:
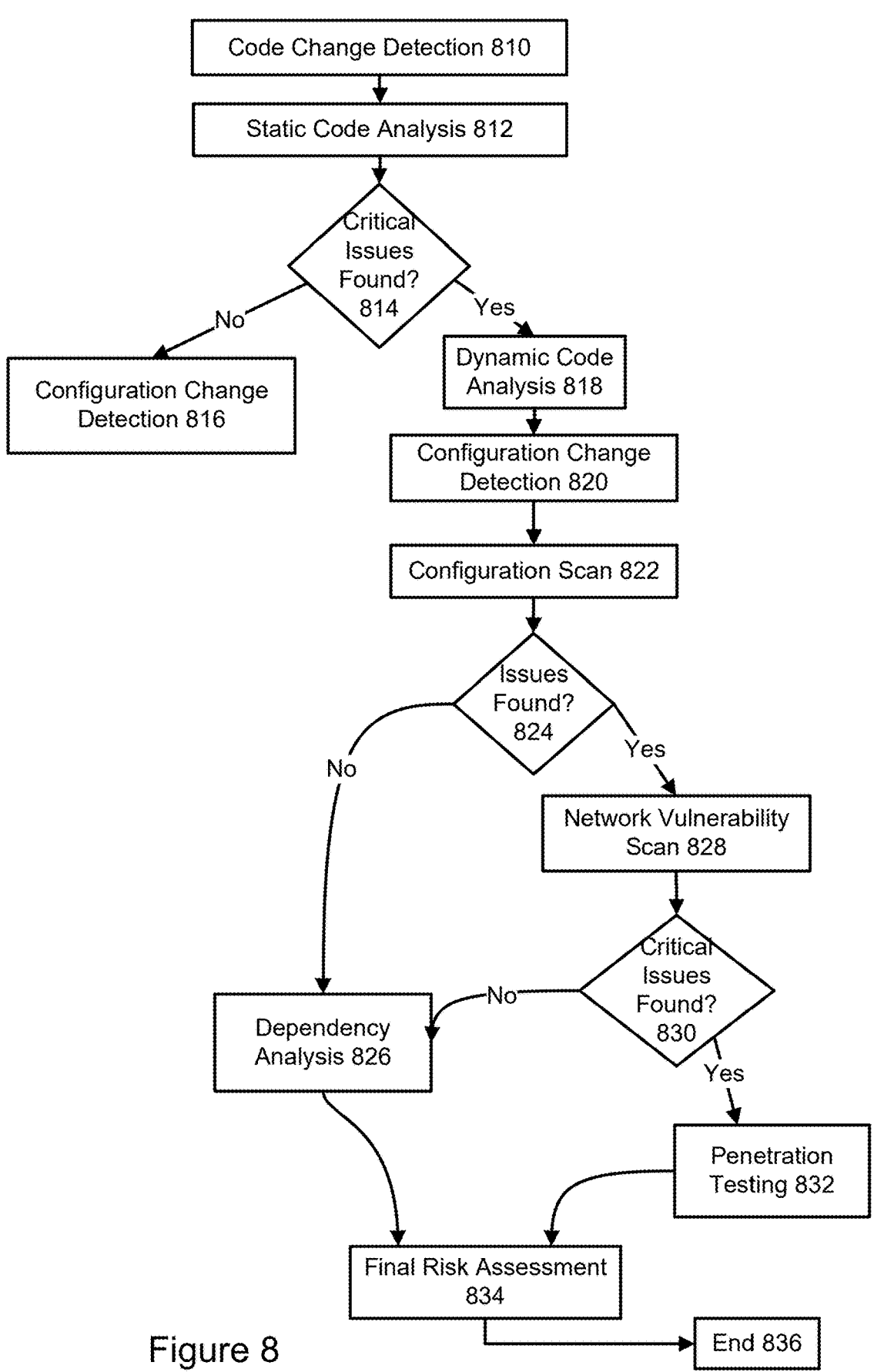
FIG. 8 is an exemplary flow diagram, according to an embodiment of the present invention.

FIG. 8 is an exemplary flow diagram, according to an embodiment of the present invention. FIG. 8 illustrates a flowchart that supports complex code changes with deployment modifications.

When significant changes are made to both the codebase and deployment configurations (e.g., introducing new features, modifying APIs, and updating infrastructure settings), the adaptive scan chain triggers multiple scans in a granular sequence to ensure comprehensive security coverage.

Step 810 represents a Code Change Detection. In this example, major changes in the codebase, such as new feature additions or API modifications, may be identified. At an initial static code analysis, a static code analysis scan may be triggered at step 812 to detect vulnerabilities in the modified code.

At a dynamic code analysis, if critical issues are found in the static scan (at step 814), a dynamic code analysis scan may be initiated to validate runtime vulnerabilities at step 818. If no critical issues are found, a configuration change detection may be applied at step 816.

In addition, deployment configuration changes may be detected, such as updates to infrastructure or network settings, at step 820.

A configuration scan is triggered to validate the integrity of the new deployment settings at step 822.

If issues are detected in the configuration scan at step 824, a network vulnerability scan may be initiated to assess the impact on the broader environment at step 828.

The system may evaluate third-party libraries and dependencies for vulnerabilities, at step 830.

Based on the results of previous scans, a penetration test may be performed to simulate real-world attack scenarios at step 832. If no critical issues are found at steps 824 and 830, dependency analysis may be performed at step 826.

A final risk assessment may be performed ate step 834 where an embodiment of the present invention aggregates results from all scans and generates a comprehensive risk report for developers and security teams. The process ends ate 836.

The system components illustrated in the Figures above are exemplary and illustrative and may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

The systems illustrated above may be implemented in a variety of ways. Architecture within the illustrated systems may be implemented as hardware components (e.g., module) within one or more network elements. It should also be appreciated that architecture within the systems may be implemented in computer executable software (e.g., on a tangible, non-transitory computer-readable medium) located within one or more network elements. Module functionality of architecture within the systems may be located on a single device or distributed across a plurality of devices including one or more centralized servers and one or more mobile units or end user devices. The architecture depicted in the systems is meant to be exemplary and non-limiting. For example, while connections and relationships between the elements of the systems are depicted, it should be appreciated that other connections and relationships are possible. The systems described above may be used to implement the various methods herein, by way of example. Various elements of the systems may be referenced in explaining the exemplary methods described herein.

Connections illustrated in the Figures above may represent networks including wireless network, a wired network or any combination of wireless network and wired network. Networks may further include one, or any number of the exemplary types of networks operating as a stand-alone network or in cooperation with each other. Networks may utilize one or more protocols of one or more network elements to which it is communicatively coupled. Networks may translate to or from other protocols to one or more protocols of network devices. Although the connections in FIG. 1 may be depicted as one network for simplicity, it should be appreciated that according to one or more embodiments, Networks may comprise a plurality of interconnected networks, such as, for example, a service provider network, the Internet, a cellular network, corporate networks, or even home networks, or any of the types of networks mentioned above.

Data may be transmitted and received via Networks utilizing a standard networking protocol or a standard telecommunications protocol. For example, data may be transmitted using protocols and systems suitable for transmitting and receiving data. Data may be transmitted and received wirelessly or in some cases may utilize cabled network or telecom connections or other wired network connection.

While the Figures above illustrates individual devices or components, it should be appreciated that there may be several of such devices to carry out the various exemplary embodiments. Systems may communicate using any mobile or computing device, such as a laptop computer, a personal digital assistant, a smartphone, a smartwatch, smart glasses, other wearables or other computing devices capable of sending or receiving network signals.

Systems may be communicatively coupled to various local and remote storage components. These storage components may include any suitable data structure to maintain the information and allow access and retrieval of the information. The storage may be local, remote, or a combination. The storage components may have back-up capability built-in. Communications with the storage components may be over a network or communications may involve a direct connection between the various storage components, as depicted in the Figures above. The storage components may also represent cloud or other network based storage.

Those skilled in the art will appreciate that the diagrams discussed above are merely examples of a system and a method for adaptive selection of security scanning in software deployments and are not intended to be limiting. Other types and configurations of networks, servers, databases and personal computing devices (e.g., desktop computers, tablet computers, mobile computing devices, smart phones, etc.) may be used with exemplary embodiments of the invention.

Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of devices whereby a user may interact with a network that transmits and delivers data and information used by the various systems and methods described herein. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art.

In some embodiments, the computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one accelerated processing unit, such as a GPU or FPGA, and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, IOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the invention have been described herein in the context of a particular implementation in a particular environment for a particular purpose, those skilled in the art will recognize that its usefulness is not limited thereto and that the embodiments of the invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented system comprising:
a computer server comprising one or more processors;
a memory component that stores and manages software development data; and
non-transitory memory comprising instructions that, when executed by the one or more processors, cause the one or more processors to:
initiate, via a software development pipeline, an update in a software application during a software development cycle;
detect, via a change evaluation processor, a change in the software application between the update and a prior version wherein the change is assigned a corresponding change type;

perform, via a contextual awareness processor, a contextual analysis for the detected change based on a potential impact of the change on the software application;
determine, via a risk assessment processor, a risk assessment based on the contextual analysis for the detected change;
generate, via a demand generator, a scan demand plan that comprises a set of scan tools from a pool of scan tools, comprising at least two scan tools, in a predetermined order to adaptively address the risk assessment, wherein the scan demand plan is based at least in part on resource optimization and comprises a dynamic chain of scan tools where each scan tool in the predetermined order is conditionally triggered based on results of a preceding scan tool, and wherein an output of a first scan tool is used to narrow or focus tasks for a subsequent scan tool;
apply, via an integration interface, the set of scan tools according to the predetermined order wherein the integration interface receives the scan demand plan from the demand generator and initiates and activates the set of scan tools;
receive, via a communication network, a set of results from each of the set of scan tools;
correlate the set of results in a manner that generates a composite result of vulnerabilities;
provide, via a communication network, the composite result of vulnerabilities; and
based upon the composite result of vulnerabilities, automating a response thereto comprising implementing a set of actions to address the vulnerabilities.

2. The computer-implemented system of claim 1, wherein the corresponding change type comprises one of: code change, design change, technology stack change, deployment change and configuration change.

3. The computer-implemented system of claim 1, wherein the contextual analysis is configurable to a specific entity.

4. The computer-implemented system of claim 1, wherein the contextual analysis is based on one or more rankings comprising: application asset ranking, infrastructure ranking, and business key services ranking.

5. The computer-implemented system of claim 1, wherein the risk assessment is based on security risk.

6. The computer-implemented system of claim 1, wherein the pool of scan tools comprises a plurality of tools that perform: static application security testing, dynamic application security testing, mobile application security testing, API scanning, design validation, penetration testing and logging.

7. The computer-implemented system of claim 1, wherein the pool of scan tools is configurable and specific to an entity.

8. The computer-implemented system of claim 1, wherein the change is detected at a PR stage or at a release stage within a continuous integration/continuous development pipeline.

9. A computer-implemented method, comprising the steps of:
initiating, via a software development pipeline, an update in a software application during a software development cycle;
detecting, via a change evaluation processor, a change in the software application between the update and a prior version wherein the change is assigned a corresponding change type;

performing, via a contextual awareness processor, a contextual analysis for the detected change based on a potential impact of the change on the software application;

determining, via a risk assessment processor, a risk assessment based on the contextual analysis for the detected change;

generating, via a demand generator, a scan demand plan that comprises a set of scan tools from a pool of scan tools, comprising at least two scan tools, in a predetermined order to adaptively address the risk assessment, wherein the scan demand plan is based at least in part on resource optimization and comprises a dynamic chain of scan tools where each scan tool in the predetermined order is conditionally triggered based on results of a preceding scan tool, and wherein an output of a first scan tool is used to narrow or focus tasks for a subsequent scan tool;

applying, via an integration interface, the set of scan tools according to the predetermined order wherein the integration interface receives the scan demand plan from the demand generator and initiates and activates the set of scan tools;

receiving, via a communication network, a set of results from each of the set of scan tools;

correlating the set of results in a manner that generates a composite result of vulnerabilities;

providing, via a communication network, the composite result of vulnerabilities; and based upon the composite result of vulnerabilities, automating a response thereto comprising implementing a set of actions to address the vulnerabilities.

10. The computer-implemented method of claim 9, wherein the corresponding change type comprises one of: code change, design change, technology stack change, deployment change and configuration change.

11. The computer-implemented method of claim 9, wherein the contextual analysis is configurable to a specific entity.

12. The computer-implemented method of claim 9, wherein the contextual analysis is based on one or more rankings comprising: application asset ranking, infrastructure ranking, and business key services ranking.

13. The computer-implemented method of claim 9, wherein the risk assessment is based on security risk.

14. The computer-implemented method of claim 9, wherein the pool of scan tools comprises a plurality of tools that perform: static application security testing, dynamic application security testing, mobile application security testing, API scanning, design validation, penetration testing and logging.

15. The computer-implemented method of claim 9, wherein the pool of scan tools is configurable and specific to an entity.

16. The computer-implemented method of claim 9, wherein the change is detected at a PR stage or at a release stage within a continuous integration/continuous development pipeline.

* * * * *